US012308163B2

(12) United States Patent
Lamarre et al.

(10) Patent No.: US 12,308,163 B2
(45) Date of Patent: May 20, 2025

(54) METHODS OF MANUFACTURING PERMANENT MAGNETS BY ADDITIVE MANUFACTURING

(71) Applicant: National Research Council of Canada, Ottawa (CA)

(72) Inventors: Jean-Michel Lamarre, Boucherville (CA); Fabrice Bernier, Montréal (CA)

(*) Notice: Subject to any disclaimer, the term of this patent is extended or adjusted under 35 U.S.C. 154(b) by 453 days.

(21) Appl. No.: 17/778,285

(22) PCT Filed: Nov. 23, 2020

(86) PCT No.: PCT/CA2020/051594
§ 371 (c)(1),
(2) Date: May 19, 2022

(87) PCT Pub. No.: WO2021/102559
PCT Pub. Date: Jun. 3, 2021

(65) Prior Publication Data
US 2023/0005649 A1 Jan. 5, 2023

Related U.S. Application Data

(60) Provisional application No. 62/940,665, filed on Nov. 26, 2019.

(51) Int. Cl.
*H01F 7/02* (2006.01)
*B22F 10/25* (2021.01)
(Continued)

(52) U.S. Cl.
CPC .............. *H01F 7/021* (2013.01); *B22F 10/25* (2021.01); *B22F 10/40* (2021.01); *B33Y 10/00* (2014.12);
(Continued)

(58) Field of Classification Search
CPC ........ H01F 7/021; H01F 6/04; H01F 41/0253; B33Y 10/00; H02K 1/20; Y10T 29/4902
(Continued)

(56) References Cited

U.S. PATENT DOCUMENTS

| 6,773,763 B2 | 8/2004 | Leonardi et al. |
| 7,097,885 B2 | 8/2006 | Leonardi et al. |

(Continued)

FOREIGN PATENT DOCUMENTS

| IN | 275101 | 8/2016 |
| WO | 2019097160 A1 | 5/2019 |

OTHER PUBLICATIONS

International Patent Application No. PCT/CA2020/051594, International Search Report and Written Opinion dated Feb. 9, 2021.
(Continued)

*Primary Examiner* — Thiem D Phan
(74) *Attorney, Agent, or Firm* — Borden Ladner Gervais LLP; Andrew D. Sojonky

(57) ABSTRACT

The present disclosure is directed towards a method of manufacturing a permanent magnet such that the magnet defines a channel for allowing circulation of a coolant through the permanent magnet, or defines a channel for allowing circulation of the coolant through an interface between the permanent magnet and a substrate. Magnets made by this method may be useful for manufacturing and/or operating a machine, such as a motor, engine, or sensor.

16 Claims, 4 Drawing Sheets

(a)

(b)

(51) Int. Cl.

| | |
|---|---|
| *B22F 10/40* | (2021.01) |
| *B33Y 10/00* | (2015.01) |
| *B33Y 70/00* | (2020.01) |
| *B33Y 80/00* | (2015.01) |
| *H01F 1/057* | (2006.01) |
| *H01F 41/02* | (2006.01) |
| *H02K 1/02* | (2006.01) |

(52) U.S. Cl.
CPC .............. *B33Y 70/00* (2014.12); *B33Y 80/00* (2014.12); *H01F 1/0577* (2013.01); *H01F 41/0266* (2013.01); *H01F 41/0293* (2013.01); *H02K 1/02* (2013.01); *Y10T 29/4902* (2015.01)

(58) Field of Classification Search
USPC ................................ 29/602.1, 596, 598, 604
See application file for complete search history.

(56) References Cited

U.S. PATENT DOCUMENTS

| | | | | |
|---|---|---|---|---|
| 11,017,943 | B2 * | 5/2021 | Wu | ............... H01F 41/0266 |
| 11,316,394 | B2 * | 4/2022 | Klonowski | ............ H01F 7/021 |
| 2012/0248780 | A1 | 10/2012 | Casazza et al. | |
| 2014/0312523 | A1 | 10/2014 | Kawashita et al. | |
| 2015/0097644 | A1 | 4/2015 | Shepard et al. | |
| 2015/0147479 | A1 | 5/2015 | Bunker et al. | |
| 2016/0179450 | A1 | 6/2016 | Shirai | |
| 2017/0063211 | A1 | 3/2017 | Mochida et al. | |
| 2017/0276749 | A1 * | 9/2017 | Hugon | ................. G01R 33/445 |
| 2018/0152088 | A1 * | 5/2018 | Suzuki | ................. H02K 11/215 |

OTHER PUBLICATIONS

International Patent Application No. PCT/CA2020/051594, International Preliminary Report on Patentability dated Jun. 9, 2022.

Jacimovic et al., "Net Shape 3D Printed NdFeB Permanent Magnet," Advanced Engineering Materials, 2017, vol. 19(8), pp. 1-7.
Bernier et al., "Metal-NdFeB Composite Permanent Magnets Produced by Cold Spray," NRC Publications Archive, 2016, pp. 1-10.
Compton B.G., et al., "Direct-Write 3D Printing of NdFeB Bonded Magnets," Materials and Manufacturing Processes, 2018, vol. 33, pp. 1-2.
Gan et al., "Design and Manufacture of Nd—Fe—B Thick Coatings by the Thermal Spray Process," Surface and Coatings Technology, 2011, vol. 205, pp. 4697-4704.
Gan et al., "Effects of Standoff Distance on Porosity, Phase Distribution and Mechanical Properties of Plasma Sprayed Nd—Fe—B Coatings," Surface and Coatings Technology, 2013, vol. 216, pp. 127-138.
Gutfleisch et al., "Magnetic Materials and Devices for the 21st Century: Stronger, Lighter, and More Energy Efficient," Advanced Materials (Deerfield Beach, Fla.), 2011, vol. 23(7), 821-842.
Jean-Michel et al., "Permanent Magnets Produced by Cold Spray Additive Manufacturing for Electric Engines," Journal of Thermal Spray Technology, 2019, vol. 28, pp. 1709-1717.
King et al., "Rare Earth/Metal Composite Formation by Cold Spray," Journal of Thermal Spray Technology, 2007, vol. 17, pp. 221-227.
Lamarre et al., "Permanent Magnets Produced by Cold Spray Additive Manufacturing," NRC presentation, Jan. 2017.
Willson M., et al., "Plasma Sprayed Nd—Fe—B Permanent Magnets," Journal of Applied Physics, 2003, vol. 93 (10), pp. 7987-7989.
Wyslocki., "Magnetic Properties, Microstructures and Domain Structures of Arc-plasma Sprayed Nd—fe—B Permanent Magnet," Journal of Materials Science, 1992, vol. 27(14), pp. 3777-3781.
Yoshida Y. "Recent Developments in High-Performance NdFeB Magnets and Bonded Rare-Earth Magnets," Magnetics, Jan. 21-22, 2016, Jacksonville, Florida, USA, 40 pages.

* cited by examiner (a) (b)

METHODS OF MANUFACTURING PERMANENT MAGNETS BY ADDITIVE MANUFACTURING

FIELD

The present disclosure relates generally to manufacturing permanent magnets. More particularly, the present disclosure relates to methods of manufacturing permanent magnets by additive manufacturing.

BACKGROUND

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

Development of sintered permanent magnets based on NdFeB using powder metallurgy techniques dates back to the early 1980s. Since then, NdFeB has been a best performing material for fabrication of permanent magnets (PM) [O. Gutfleich et. al., Magnetic Materials and Devices for the 21st Century: Stronger; Lighter and More Energy Efficient, Advanced Materials, 23 (2011), 821-842]. A standard procedure involves compaction of powder materials in a die having the shape of the components to be produced [Y. Yoshida, Recent Developments in High Performance NdFeB Magnets and Bonded Rare-Earth Magnets, Magnetics 2016, January 21-22, Jacksonville, Florida, USA]. The powder metallurgy route does not offer a lot of flexibility for shaping of magnets, thus limiting their design.

Another manufacturing approach is based on thermal spray technologies. It consists of directly building magnetic material, therefore eliminating assembly steps while adding shape flexibility via highly automated spray techniques. NdFeB materials have been sprayed using different techniques, such as arc spray [J. J. Wyslocki, Magnetic Properties, Microstructure and Domain Structures of Arc-Plasma Sprayed Nd—Fe—B Permanent Magnet, Journal of Materials Science, 27, 14 (2012), 3777-3781], plasma spray [M. Willson, et. al., Plasma sprayed Nd—F—B Permanent Magnets, Journal of Applied Physics, 93, 10(2003), 7987-7989, J. A. Gan, et. al., Effect of Standoff Distance of Plasma Sprayed Nd—Fe—B coatings, Surface & Coatings Technology, 216 (2013), 127-138], and flame spray [J. A. Gan, et. al., Design and Manufacture of Nd—Fe—B thick Coatings by the Thermal Spray Process, Surface & Coatings Technology, 205, 19 (2011), 4697-4704]. However, a common problem faced with these techniques is conserving initial powder stoichiometry. Indeed, plasma and flame spray processes use high gas temperatures causing powder oxidation, resulting in a decrease of the magnetic performance of deposited coatings. One way around this issue is to use higher velocity and lower temperature techniques such as cold spray [P. C. King, et al., Rare earth/metal composite formation by cold spray, Journal of Thermal Spray Technology, 17, 2 (2008), 221-227].

Permanent NdFeB-type magnets increase sharply in price as their maximum service temperature increases. In order to stabilize the magnets and avoid demagnetization, heavy rare-earth elements (HREE, such as Dy, Tb, etc.) are added for service temperatures above 100° C. Typically, addition of HREE increases magnet coercivity at the expense of a decrease in remanence. Dysprosium content, which is scarcer then neodymium and thus more expensive, can be as high as 10% for the most demanding applications where the temperature reach up to 180° C. For hybrid motors, use of HREE can lead to a major cost increase [O. Gutfleich et. al., Magnetic Materials and Devices for the 21st Century: Stronger; Lighter and More Energy Efficient, Advanced Materials, 23 (2011), 821-842].

Since the cost of rare earth and heavy rare-earth elements represents a significant portion of the price of electric motors, important cost reductions can be achieved by optimizing motor design and reducing heavy rare-earth element use. However, present designs of electrical engines and machines do not permit the magnets to be cooled efficiently. In view of cost and manufacturing methods, magnets usually have very simple shapes. Also recourse to machining is usually avoided as much as possible due to material waste and magnet brittleness. Those two issues seriously restrict the integration of cooling systems and limit freedom in the design of electrical machines. Hence, the cooling systems of present-day electrical machines are contained within an envelope of the machine, considerably limiting their performance and increasing their size. Typically, in assembling electrical machines, the magnets are inserted into cavities, or glued to the wall of a rotor. Such assembly methods create additional interfaces where air and/or glues thermally insulate the magnets, limiting heat extraction.

There remains a need for an alternative approach to cooling or for more effective and local cooling of permanent magnets.

SUMMARY

In an aspect of the present disclosure, there is provided a method of manufacturing a permanent magnet, comprising providing a permanent magnet powder composition, and forming the permanent magnet by additive manufacturing directly on a substrate using the permanent magnet powder composition, the permanent magnet defining a channel for allowing circulation of a coolant through the permanent magnet, or defining a channel for allowing circulation of the coolant through an interface between the permanent magnet and the substrate.

In an embodiment of the present disclosure, there is provided a method of manufacturing a permanent magnet wherein forming the permanent magnet comprises: (i) sequentially building up the permanent magnet defining the channel using the permanent magnet powder composition; (ii) embedding tubing in the permanent magnet, the tubing defining the channel; (iii) embedding a sacrificial material in the permanent magnet, and then removing the sacrificial material to form the permanent magnet defining the channel; or (iv) any combination thereof.

In another embodiment, there is provided a method of manufacturing a permanent magnet wherein the permanent magnet powder composition comprises a hard magnetic powder.

In another embodiment, there is provided a method of manufacturing a permanent magnet wherein the hard magnetic powder comprises an AlNiCo alloy, a NdFeB alloy, a SmCo alloy, a SmFeCo alloy, or a combination thereof.

In another embodiment, there is provided a method of manufacturing a permanent magnet wherein the hard magnetic powder comprises NdFeB, a NdFeB alloy, or a combination thereof.

In another embodiment, there is provided a method of manufacturing a permanent magnet wherein the additive manufacturing is cold spray additive manufacturing.

In another embodiment, there is provided a method of manufacturing a permanent magnet wherein the permanent magnet powder composition further comprises a binder.

In another embodiment, there is provided a method of manufacturing a permanent magnet wherein the binder comprises a metal.

In another embodiment, there is provided a method of manufacturing a permanent magnet wherein the metal comprises Al, Cu, Ti, Zn, Fe, Ni, Ag, Au, an alloy thereof, or a combination thereof.

In another embodiment, there is provided a method of manufacturing a permanent magnet wherein the metal is Al, an alloy thereof, or a combination thereof.

In another embodiment, there is provided a method of manufacturing a permanent magnet wherein the permanent magnet powder composition comprises approximately 34 vol % to approximately 99 vol % hard magnetic powder; and approximately 1 vol % binder to approximately 66 vol % binder. In another embodiment, there is provided a method of manufacturing a permanent magnet wherein the permanent magnet powder composition comprises approximately 34 vol % to approximately 100 vol % hard magnetic powder; and approximately 0 vol % binder to approximately 66 vol % binder.

In another embodiment, there is provided a method of manufacturing a permanent magnet wherein the permanent magnet powder composition comprises approximately 34 vol % to approximately 51 vol % hard magnetic powder.

In another embodiment, there is provided a method of manufacturing a permanent magnet wherein the permanent magnet powder composition comprises approximately 51 vol % to approximately 99 vol % hard magnetic powder.

In another embodiment, there is provided a method of manufacturing a permanent magnet wherein the permanent magnet powder composition comprises approximately 1 vol % binder to approximately 25 vol % binder.

In another embodiment, there is provided a method of manufacturing a permanent magnet wherein the permanent magnet powder composition comprises approximately 25 vol % binder to approximately 49 vol % binder.

In another embodiment, there is provided a method of manufacturing a permanent magnet wherein the permanent magnet powder composition comprises approximately 49 vol % binder to approximately 66 vol % binder.

In another embodiment, there is provided a method of manufacturing a permanent magnet wherein the substrate is a metallic substrate.

In another embodiment, there is provided a method of manufacturing a permanent magnet wherein the metallic substrate is an aluminum-based substrate, an iron-based substrate, a copper-based substrate, or a combination thereof.

In another aspect of the present disclosure, there is provided a permanent magnet formed by the method as described herein.

In another aspect of the present disclosure, there is provided a use of the permanent magnet as described herein for manufacturing an electric machine.

In another aspect of the present disclosure, there is provided a use of the permanent magnet as described herein for operating an electric machine.

In another embodiment of the present disclosure, there is provided a use of the permanent magnet as described herein wherein the electric machine includes an electric motor or an electric engine.

In another aspect of the present disclosure, there is provided a use of the permanent magnet as described herein for manufacturing a sensor.

In another aspect of the present disclosure, there is provided a use of the permanent magnet as described herein for operating a sensor.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

Figure 1:
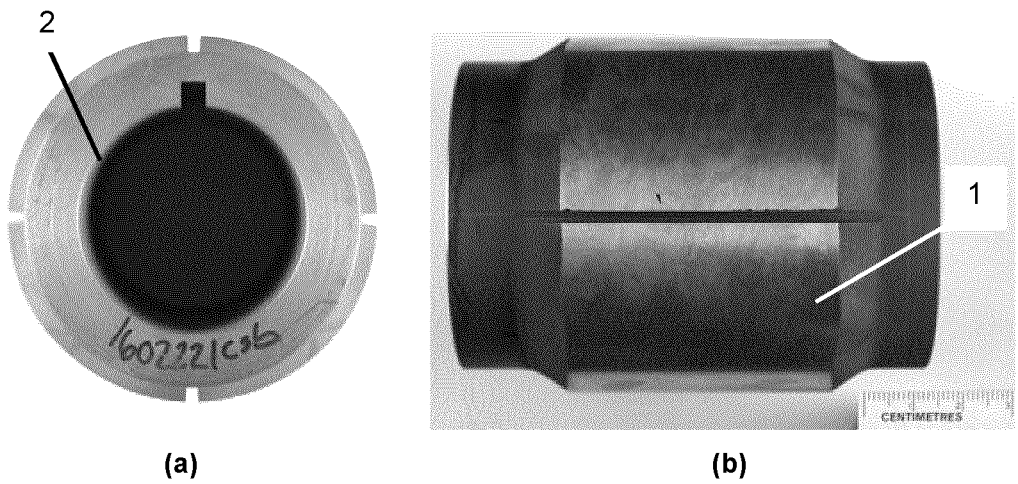
FIG. 1 depicts an NdFeB—Al thick coating (1) that has been sprayed on a 67 mm diameter cylinder (2).

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

As used herein, the terms 'magnet(s)' and 'permanent magnet(s)' are used interchangeably to refer to a permanent magnet(s).

As used herein, 'NdFeB' refers to a hard magnetic powder of a permanent magnet powder composition, or permanent magnet, and may be otherwise represented as 'FeNdB', or any other order or ratio of the elements Nd, Fe, and B. In some embodiments, other elements may be added to the hard magnetic powder NdFeB to control particular properties, such as high temperature stability.

As used herein, 'binder' and 'metal M' or 'M' are used interchangeably, and refer to a matrix added to a permanent magnet powder composition during additive manufacturing (e.g., cold spray) of a permanent magnet to provide an increased deposition efficiency, good thermal conductivity, and/or corrosion/oxidation protection.

Generally, the present disclosure provides a method of manufacturing permanent magnets by additive manufacturing. Herein described methods may provide for a more effective and/or local cooling of permanent magnets, so as to prevent or reduce their exposure to high temperatures. Further, herein described methods may provide for the manufacturing of permanent magnets having complex geometries via additive manufacturing techniques, such as by the cold spraying of an M-NdFeB composite. An M-NdFeB composite magnet may possess higher mechanical properties than a standard NdFeB magnet, wherein M is a metal which allows for an increased deposition efficiency and thermal conductivity, and/or protects the magnet from oxidization. As described herein, additive manufacturing, such as cold spray, allows for cooling channels to be built directly into, or embedded into a permanent magnet. In addition, the methods described herein provide for magnets to be laid directly on a surface; for example, a rotor of an electric motor, hence eliminating an insulating air or adhesives interface.

In an example, there is a method of manufacturing a permanent magnet, comprising providing a permanent magnet powder composition, and forming the permanent magnet by additive manufacturing directly on a substrate using the permanent magnet powder composition, the permanent magnet defining a channel for allowing circulation of a coolant through the permanent magnet, or defining a channel for allowing circulation of the coolant through an interface between the permanent magnet and the substrate.

In another example, there is a method of manufacturing a permanent magnet wherein forming the permanent magnet comprises: (i) sequentially building up the permanent magnet defining the channel using the permanent magnet powder composition; (ii) embedding tubing in the permanent magnet, the tubing defining the channel; (iii) embedding a sacrificial material in the permanent magnet, and then removing the sacrificial material to form the permanent magnet defining the channel; or (iv) any combination thereof.

In another example, there is a method of manufacturing a permanent magnet wherein the permanent magnet powder composition comprises a hard magnetic powder. In another example, the hard magnetic powder comprises an AlNiCo alloy, a NdFeB alloy, a SmCo alloy, a SmFeCo alloy, or a combination thereof. In another example, the hard magnetic powder comprises NdFeB, a NdFeB alloy, or a combination thereof.

In another example, there is a method of manufacturing a permanent magnet wherein the additive manufacturing is cold spray additive manufacturing.

In another example, there is a method of manufacturing a permanent magnet wherein the permanent magnet powder composition further comprises a binder. In another example, the binder comprises a metal. In another example, the metal comprises Al, Cu, Ti, Zn, Fe, Ni, Ag, Au, an alloy thereof, or a combination thereof. In another example, the metal is Al, an alloy thereof, or a combination thereof.

In another example, there is a method of manufacturing a permanent magnet wherein the permanent magnet powder composition comprises approximately 34 vol % to approximately 99 vol % hard magnetic powder; and approximately 1 vol % binder to approximately 66 vol % binder. In another example, there is a method of manufacturing a permanent magnet wherein the permanent magnet powder composition comprises approximately 34 vol % to approximately 100 vol % hard magnetic powder; and approximately 0 vol % binder to approximately 66 vol % binder. In another example, the permanent magnet powder composition comprises approximately 34 vol % to approximately 51 vol % hard magnetic powder. In another example, the permanent magnet powder composition comprises approximately 51 vol % to approximately 99 vol % hard magnetic powder. In another example, the permanent magnet powder composition comprises approximately 1 vol % binder to approximately 25 vol % binder. In another example, the permanent magnet powder composition comprises approximately 25 vol % binder to approximately 49 vol % binder. In another example the permanent magnet powder composition comprises approximately 49 vol % binder to approximately 66 vol % binder.

In another example, there is a method of manufacturing a permanent magnet wherein the substrate is a metallic substrate. In another example, the metallic substrate is an aluminum-based substrate, an iron-based substrate, a copper-based substrate, or a combination thereof.

In another example, there is a permanent magnet formed by the method as described herein.

In another example, there is a use of the permanent magnet as described herein for manufacturing an electric machine.

In another example, there is a use of the permanent magnet as described herein for operating an electric machine. In another example, there is a use of the permanent magnet as described herein wherein the electric machine includes an electric motor or an electric engine.

In another example, there is a use of the permanent magnet as described herein for manufacturing a sensor. In another example, there is a use of the permanent magnet as described herein for operating a sensor.

Cold Spray Additive Manufacturing

Cold spray is a process where a material is built onto a substrate by the deformation and bonding of particles impacting at high velocities. Generally, particles are accelerated using a heated, high pressure gas, such as nitrogen, that is fed through nozzle typically using a de Laval configuration. The gas temperature may be heated to hundreds of degrees Celsius; however, the actual particle temperature remains much cooler. Particle speeds of several hundred meters per second may be obtained, thus providing resulting built materials that are very dense (typically <1% porosity), and exhibit adhesion values generally higher than what can be obtained using conventional thermal spray technologies.

In an example, a cold spray process may be carried out using a Plasma Giken 800 gun, with a main gas temperature of about 400° C. to about 800° C., or about 600° C. to about 700° C. and a maximal pressure of about 5 MPa, or about 3 MPa to about 5 MPa. In another example, a spray distance of about 80 mm to a surface may be used. In another example, methods of cold spraying a permanent magnet powder composition may be fully automated; for example, using a robot and robot programing. In such an example, the robot traverse speeds and steps may be dependent on the geometry of the permanent magnet being manufactured. As would be understood by a skilled person, the set temperatures, pressures, spray distances, etc. may depend on the magnetic powder composition being used.

In an example, the permanent magnet powder composition comprises a hard magnetic powder and a binder. In another example, the hard magnetic powder may comprise NdFeB. In another example, the binder may be the metal M as described above, to provide an increased disposition efficiency, good thermal conductivity, and corrosion/oxidation protection. In another example, the binder or metal M may be aluminum-based, such as an aluminum powder. In an example, the permanent magnet powder composition may comprise a minimum of approximately 34 vol % hard magnet powder. In another example, the permanent magnet powder composition may comprise of approximately 34 vol % hard magnetic powder, or approximately 51 vol % hard magnetic powder, or up to approximately 99 vol % hard magnetic powder. In another example, the permanent magnet powder composition may comprise up to approximately 1 vol % binder, or up to approximately 25 vol % binder, or up to approximately 49 vol % binder, or up to approximately 66 vol % binder. In a further example, the permanent magnet powder composition may provide for an M-NdFeB composite permanent magnet.

In an example, during the spray process, care may be taken to minimize a rise in temperature of the magnetic powder, so as to limit oxidation and magnetic property degradation. In another example, the spray process may be carried out with an aim to maintaining low coating porosity, and a good deposition efficiency.

In an example, commercially available NdFeB base powders may be used. In another example, commercially available binders, for example pure aluminum powder may be used. Powder size distribution of said aluminum powder may vary. In a non-limiting example, a magnet was built using the following commercially available aluminum powder: Valimet H3, Valimet H5, Valimet H15. However, said aluminum powder may have other powder size distributions or manufacturers. Examples of suitable NdFeB magnetic powders include, but are not limited to Magnequench MQP-S-11-9, MQFP-B, MQFP-14-12, MQP-AA4-15-12; MQA-38-14, MQA-36-18.

In an example, the cold spray process may be used to manufacture permanent magnets for a permanent magnet motor. In an example, a permanent magnet powder composition comprising 75 vol % hard magnetic powder and 25 vol % binder may be used. In an example, material more than 5 mm thick may be deposited directly on, for example, a 67 mm external diameter shaft; for example, see FIG. 1 where an NdFeB—Al thick coating (1) has been sprayed on a 67 mm diameter cylinder (2). In such an example, the coating may be first machined, using a conventional lathe, to achieve a precise 77 mm external diameter; and, four pole gaps of 2.6° may be machined by wire electrical discharge machining (EDM); wherein neither cracks nor delamination may be observed. In an example, magnetization may be performed in a final step.

Permanent Magnets Comprising Conformal Cooling Channels

Herein described are methods for producing permanent magnets comprising conformal cooling channels using, for example, cold spray additive manufacturing. Further described are permanent magnet devices (for example, permanent magnet motors) comprising permanent magnets with conformal cooling channels. In some examples, the permanent magnets define a cooling channel for allowing circulation of a coolant through the permanent magnet (e.g., the channel is embedded). In other examples, the permanent magnets define a channel for allowing circulation of the coolant through an interface between the permanent magnet and a substrate (e.g., a motor part).

Permanent magnets (for example, NdFeB) are typically fabricated using techniques such as compaction and sintering. Subsequently, they are machined in order to meet tolerances, and are installed and fitted on a part as needed (for example, an electric motor rotor or stator). Such methods restrict a magnet's achievable configurations. Use of additive manufacturing processes, such as cold spray, allows for a 3D buildup of magnets having complex shapes, with little to no cost and/or production time increase. Such additional flexibility permits implementation of geometries that would be otherwise technically difficult or impossible to fabricate, or simply cost-prohibitive.

Thermal management is a well-known problem in, for example, electric machines, such as electric motors. Electric currents are needed to generate motion, while undesirable Eddy currents can flow in the magnetic parts. Both of these contribute to heat generation. When used in such electric machines, the performance of rare-earth permanent magnets degrade rapidly when operating temperatures exceed 100° C., and can eventually lead to demagnetization of the magnet and failure of the machine. In order to minimize this effect, heavy rare earths (such as Dysprosium) are added to the magnet composition to stabilize the magnet's high temperature properties at the expense of overall performance. Cooling channels can be implemented using traditional manufacturing technologies, but their efficiency in terms of magnet cooling is limited; it is very difficult to position cooling channels correctly due to intricate geometries of electric motors. Furthermore, the thermal conductivity of rare-earth permanent magnets is low.

As described herein, additive manufacturing is used to fabricate permanent magnets comprising conformal cooling channels, wherein the geometry (e.g., shape, size, etc.) of the channels depends on the geometry of the magnet and its intended application. Cold spray, or another manufacturing technology such as laser sintering, laser cladding, direct-write, extrusion, binder jetting, fused deposition modelling, etc. may be used to build the 3D shape of a magnet. Conformal cooling channels are formed, for example, by any one or combination of the following methods:

(I) Direct formation of a cooling channel, involving directly forming channels using an additive manufacturing technique. In respect of cold spray, direct formation requires use of an appropriate toolpath comprising a build-up of material using various deposition angles in order to realize a desired structure for a cooling channel defined within a magnet.

(II) Installation of custom tubing to form a cooling channel, involving installation of custom geometry tubing channels within a magnet. Tubing is banded and shaped into a correct geometry, and installed on a previously fabricated, yet incomplete 3D magnetic structure. Structure is completed by addition of material directly onto the tubing by an additive manufacturing technique. For example, the structure is designed such that coolant will circulate through the tubing.

(III) Use of sacrificial material to form an embedded cooling channel. Similar to the installation of custom tubing, a sacrificial material is shaped into a correct geometry, but is removed after fabrication of the magnet. The sacrificial material may be applied by different techniques including additive manufacturing, such as cold spray. The sacrificial material may be removed by being melted, and subsequently removed under the influence of gravity or applied pressure.

In some examples, permanent magnets comprising conformal cooling channels are built on a substrate. Such substrates may or may not be sacrificial. Generally, any metallic substrate is suitable for use in manufacturing permanent magnets comprising conformal cooling channels but ceramic or polymeric substrate can also but used. Iron-based and aluminum-based substrates are among the most commonly used. For example, an aluminum-based substrate may be used in the manufacture of permanent magnets comprising conformal cooling channels since: (i) it increases heat evacuation due to its high thermal conductivity; (ii) it can provide good deformation for good mechanical properties; (iii) it is relatively cheap; (iv) it is oxidation resistant; and (v) is light weight and thus would contribute to reducing the weight of any final assembly. An iron-based substrate may also be used in the manufacture of permanent magnets comprising conformal cooling channels because it provides good magnetic saturation for the magnetic flux path and is cheap. In other examples, a copper-based substrate may be used in the manufacture of permanent magnets comprising conformal cooling channels as it has very good thermal conductivity.

Figure 2:
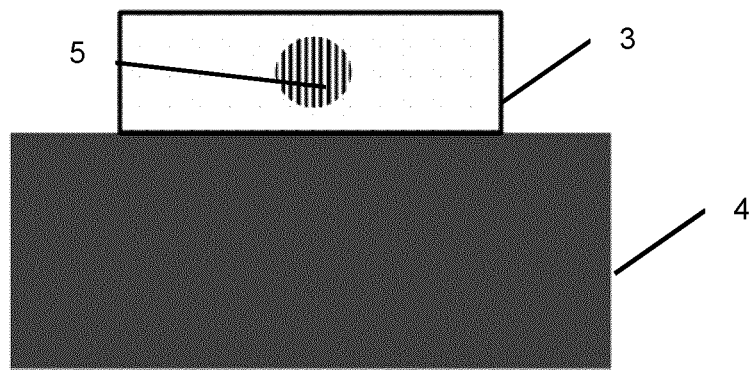
FIG. 2 depicts an exemplary surface magnet (dotted rectangle; 3) on a motor part (black rectangle; 4) defining an internal cooling channel (stripped circle; 5) for providing internal cooling.
Figure 3:
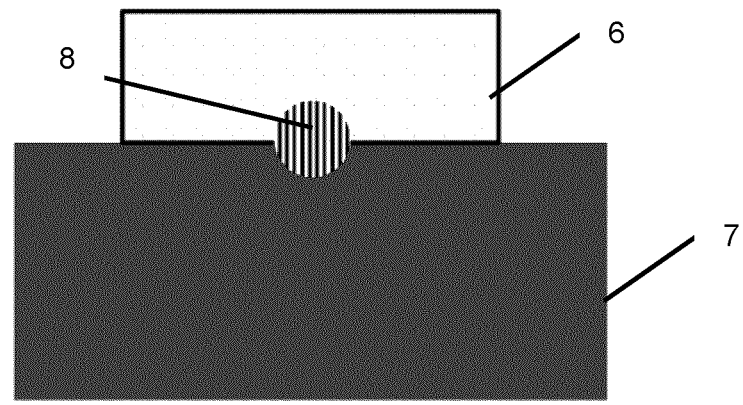
FIG. 3 depicts an exemplary surface magnet (dotted rectangle; 6) on a motor part (black rectangle; 7) defining a cooling channel at the interface (stripped circle; 8) for providing interface cooling.
Figure 4:
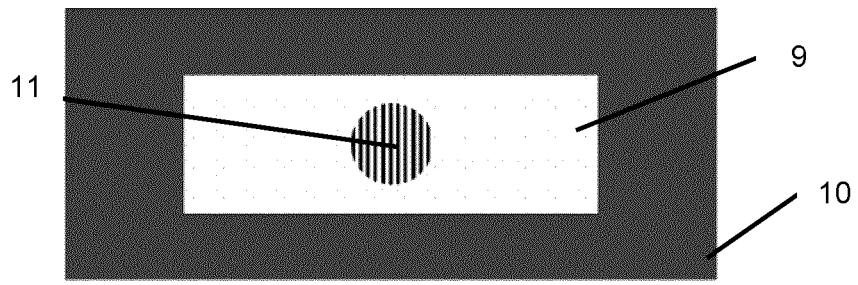
FIG. 4 depicts an exemplary embedded magnet (dotted rectangle 9) within a motor part (black rectangle; 10) defining an internal cooling channel (stripped circle; 11) for providing internal cooling.
Figure 5:
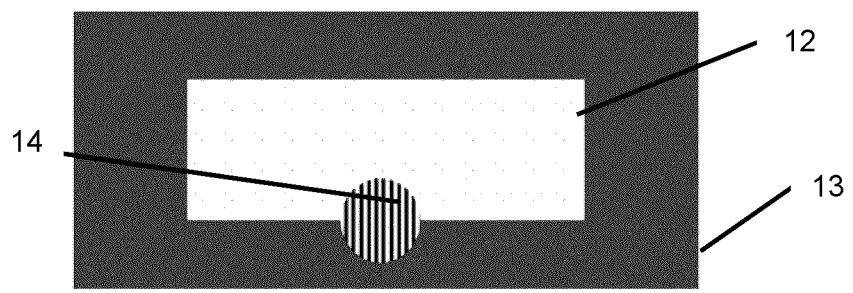
FIG. 5 depicts an exemplary embedded magnet (dotted rectangle 12) within a motor part (black rectangle; 13) defining a cooling channel at the interface (stripped circle; 14) for providing interface cooling.
Figure 6:
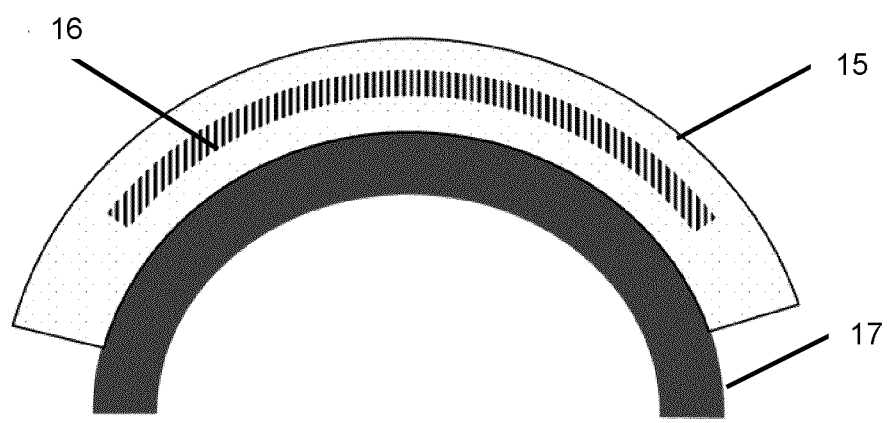
FIG. 6 depicts an exemplary surface magnet (dotted curved rectangle; 15) defining an internal cooling channel for providing interface cooling (stripped curved rectangle; 16) tailored to match the geometry of a motor part (black curved rectangle; 17).

In some examples, permanent magnets comprising conformal cooling channels may form part of a motor part, such as a rotor, stator, etc., or may form part of a sensor part. In an example, a permanent magnet comprising an embedded conformal cooling channel may be coupled to a surface of a motor part or a sensor part, the embedded conformal cooling channel at least providing internal cooling of the magnet; for example, see FIG. 2 where an exemplary surface magnet (dotted rectangle; 3) on a motor part (black rectangle; 4) defines an internal cooling channel (stripped circle; 5) for providing internal cooling. Alternatively, a permanent magnet comprising an interfacial conformal cooling channel may be coupled to a surface of a motor part or a sensor part, the interfacial conformal cooling channel providing interface cooling of the magnet and motor part or sensor part; for example, see FIG. 3, where an exemplary surface magnet (dotted rectangle; 6) on a motor part (black rectangle; 7) defines a cooling channel at the interface (stripped circle; 8) for providing interface cooling. In another example, a permanent magnet comprising an embedded conformal cooling channel may itself be embedded in a motor part or a sensor part, the embedded conformal cooling channel of the magnet at least providing internal cooling of the magnet; for example, see FIG. 4, where an exemplary embedded magnet (dotted rectangle; 9) within a motor part (black rectangle; 10) defines an internal cooling channel (stripped circle; 11) for providing internal cooling. Alternatively, a permanent magnet comprising an interfacial conformal cooling channel may itself be embedded in a motor part or a sensor part, the interfacial conformal cooling channel providing interface cooling of the magnet and motor part or sensor part; for example, see FIG. 5, where an exemplary embedded magnet (dotted rectangle; 12) within a motor part (black rectangle; 13) defining a cooling channel at the interface (stripped circle; 14) for providing interface cooling. In another example, a permanent magnet comprising an embedded or interfacial conformal cooling channel may have a configuration tailored in size and shape to match the geometry of, and to couple to the surface of a motor part or a sensor part; for example, see FIG. 6, where an exemplary surface magnet (dotted curved rectangle; 15) defines an internal cooling channel for providing interface cooling (stripped curved rectangle; 16) tailored to match the geometry of a motor part (black curved rectangle; 17). In an example, a permanent magnet as depicted in any one of FIGS. 2 to 6 may thus be used in manufacturing or operating a sensor.

Permanent magnets comprising conformal, embedded cooling channels can offer enhanced thermal management capabilities, at least because of:

(I) Enhanced heat evacuation, as conformal cooling channels can be positioned directly inside structures that need to be cooled (i.e. magnets). Intimate contact that is created favors heat evacuation via direct conduction, thus increasing the effective heat transfer coefficient.

(II) Better temperature uniformity and control, as conformal cooling channels can be designed with shapes matching the geometry of the magnets and the desired temperature profile. It can be used to cool magnet regions that are difficult to cool using traditional cooling strategies. It can also be used to adapt the cooling power in such a way as to obtain better temperature uniformity, thus protecting against hot spot degradations.

(III) Enhanced thermal conductivity and mechanical properties, as permanent magnets fabricated using cold spray additive manufacturing include a metallic binder (i.e., metal M) that improves the effective composite thermal conductivity while improving mechanical properties.

Figure 7:
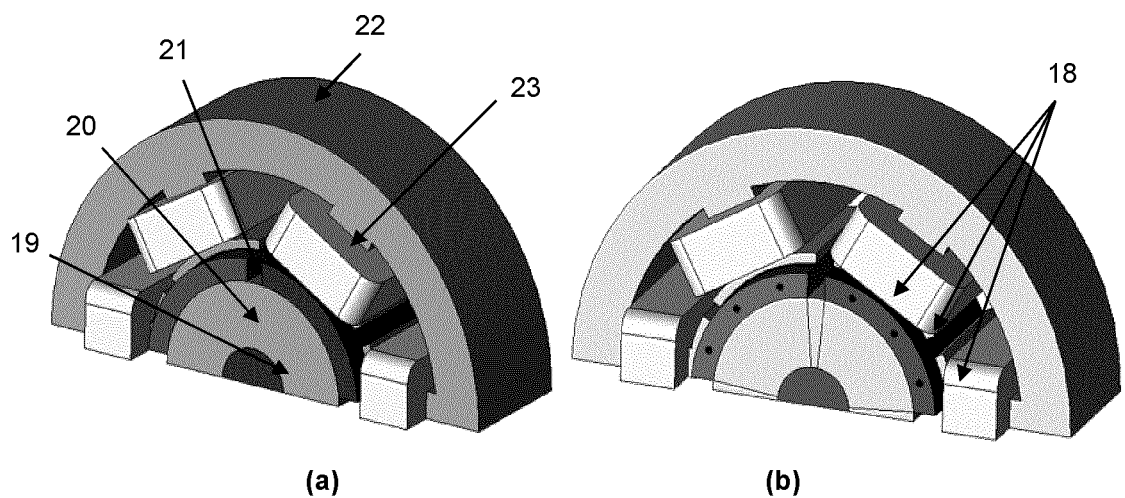
FIG. 7 depicts (a) a first motor configuration without cooling channels, and (b) a second motor configuration with cooling channels (18), where each motor configuration has a shaft (19), rotor core (20), permanent magnet (21), stator core (22), and armature coils (23).
Figure 8:
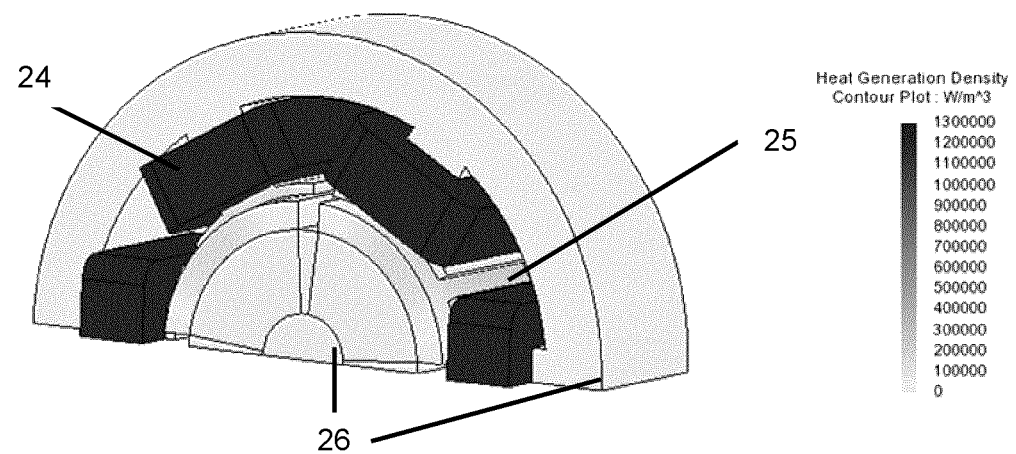
FIG. 8 depicts the first motor configuration and indicates where heat is generated therein, where the coils 23 have a heat generation density between about 1100000 to about 1300000 (24); the magnetic circuit (permanent magnets 21 and surrounding steel of stator core 22) has a heat generation density between about 100000 to about 300000 (25); and the shaft 19, rotor core 20, and stator core 22 have a heat generation density between about 0 to about 100000 (26).
Figure 9:
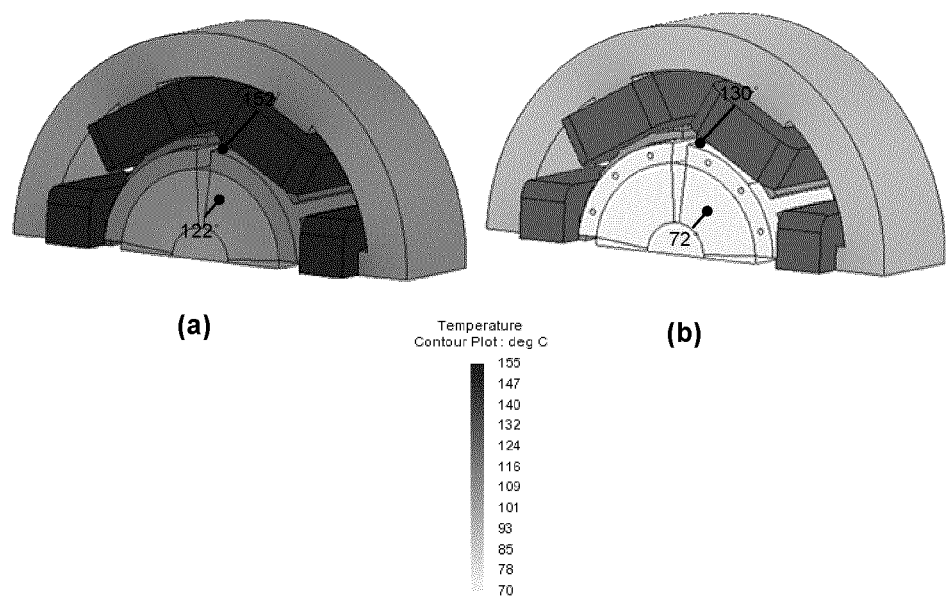
FIG. 9 depicts (a) the first motor configuration and temperature distribution therein, where the coils 23 have a temperature of about 152° C. and permanent magnet 21 has a temperature of about 122° C.; and (b) the second motor configuration and temperature distribution therein, where the coils 23 have a temperature of about 130° C. and permanent magnet 21 has a temperature of about 72° C.
Figure 10:
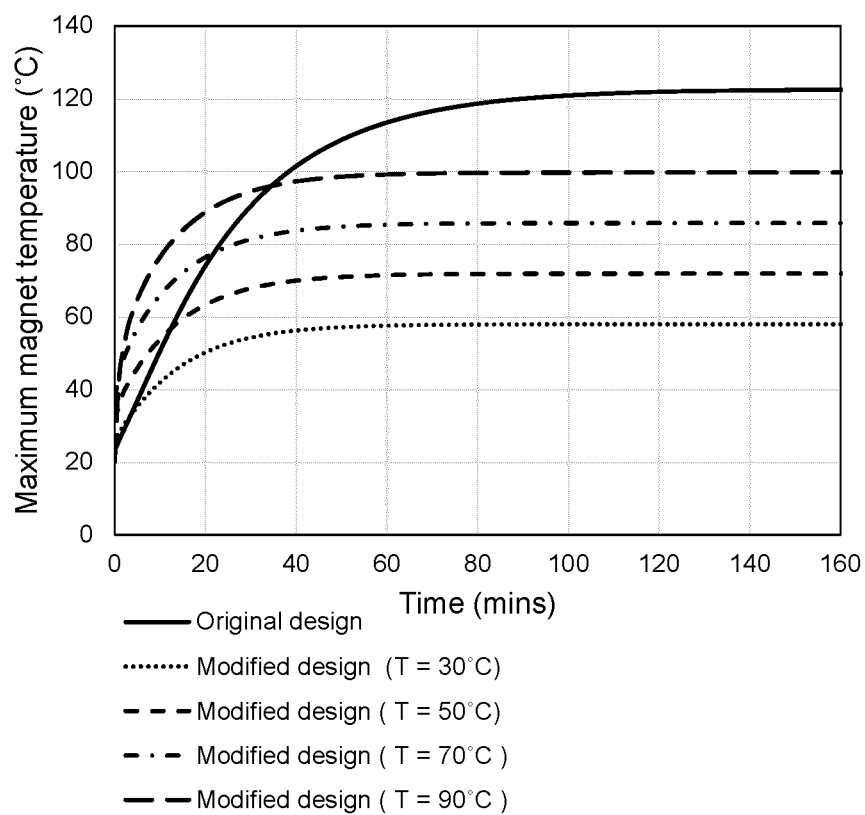
FIG. 10 graphically depicts maximum magnet temperatures for the first motor configuration (original design) and for the second motor configuration (modified design).

FIGS. 7 to 10 depict thermal modelling and analysis that was conducted of a first motor configuration having a permanent magnet without cooling channels (see FIG. 7a), and a second motor configuration having a permanent magnet with cooling channels (18) (see FIG. 7b), where each motor configuration has a shaft (19), rotor core (20), permanent magnet (21), stator core (22), and armature coils (23) (indicated in FIG. 7a only). Said modeling was based on a theoretical model using experimental values, and was conducted using Finite Element Analysis using the JMAG software. As shown in FIG. 8, heat was mostly generated in the coil (e.g., where the coils 23 have a heat generation density between about 1100000 to about 1300000 (24)), but some heat was also generated in the magnetic circuit (magnets and steel) via hysteresis and Eddy current losses (e.g., where the magnetic circuit (permanent magnets 21 and surrounding steel of stator core 22) has a heat generation density between about 100000 to about 300000 (25). Sources of this heat include Joule heat generation in the coils; hysteresis losses; eddy current losses; and minor friction in the mechanical parts. As shown in FIG. 9, the second motor configuration (e.g., see FIG. 9 (b), where the coils 23 have a temperature of about 130° C. and permanent magnet 21 has a temperature of about 72° C.) provided a motor that ran at a much lower average and peak temperature than the motor of the first motor configuration (e.g., see FIG. 9 (a) where the coils 23 have a temperature of about 152° C. and permanent magnet 21 has a temperature of about 122° C.). Particularly, the magnets and the center part of the motor of the second motor configuration were maintained below the critical operation temperature of NdFeB magnets. FIG. 10 graphically depicts maximum magnet temperatures achieved over time for the first motor configuration (original design) relative to the second motor configuration (modified design). This suggested that the maximum magnet temperature can be chosen as a function of the coolant (e.g., oil) temperature (T value in brackets). In the first motor configuration, the magnet temperature increased to above 120° C., which may lead to magnetic properties degradation. In the second motor configuration, the magnet temperature was lower, highlighting that lower grade, cheaper magnets may be used with appropriate cooling channels configurations or that the motor can be operated in tougher conditions.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of manufacturing a permanent magnet, comprising:
    providing a permanent magnet powder composition, and
    forming the permanent magnet by additive manufacturing directly on a substrate using the permanent magnet powder composition,
    the permanent magnet defining a channel for allowing circulation of a coolant through the permanent magnet, or
    defining a channel for allowing circulation of the coolant through an interface between the permanent magnet and the substrate,
    wherein forming the permanent magnet comprises:
        (i) sequentially building up the permanent magnet defining the channel using the permanent magnet powder composition;
        (ii) embedding tubing in the permanent magnet, the tubing defining the channel;
        (iii) embedding a sacrificial material in the permanent magnet, and then removing the sacrificial material to form the permanent magnet defining the channel; or
        (iv) any combination thereof.

2. The method of claim 1, wherein the permanent magnet powder composition comprises a hard magnetic powder.

3. The method of claim 2, wherein the hard magnetic powder comprises NdFeB, an AlNiCo alloy, a NdFeB alloy, a SmCo alloy, a SmFeCo alloy, or a combination thereof.

4. The method of claim 1, wherein the additive manufacturing is cold spray additive manufacturing.

5. The method of claim 4, wherein the permanent magnet powder composition further comprises a binder.

6. The method of claim 5, wherein the binder comprises a metal.

7. The method of claim 6, wherein the metal comprises Al, Cu, Ti, Zn, Fe, Ni, Ag, Au, an alloy thereof, or a combination thereof.

8. The method of claim 4, wherein the permanent magnet powder composition comprises approximately 34 vol % to approximately 99 vol % hard magnetic powder; and approximately 1 vol % binder to approximately 66 vol % binder.

9. The method of claim 8, wherein the permanent magnet powder composition comprises approximately 34 vol % to approximately 51 vol % hard magnetic powder, or approximately 51 vol % to approximately 99 vol % hard magnetic powder.

10. The method of claim 8, wherein the permanent magnet powder composition comprises approximately 1 vol % binder to approximately 25 vol % binder; or approximately 25 vol % binder to approximately 49 vol % binder; or approximately 49 vol % binder to approximately 66 vol % binder.

11. The method of claim 1, wherein the substrate is a metallic substrate.

12. The method of claim 11, wherein the metallic substrate is an aluminum-based substrate, an iron-based substrate, a copper-based substrate, or a combination thereof.

13. A permanent magnet formed by the method of claim 1.

14. The permanent magnet of claim 13, useful for manufacturing or operating an electric machine.

15. The magnet of claim 14, wherein the electric machine includes an electric motor or an electric engine.

16. The permanent magnet of claim 13, useful for manufacturing or operating a sensor.

* * * * *